United States Patent [19]
Miyazaki et al.

[11] Patent Number: 5,712,662
[45] Date of Patent: Jan. 27, 1998

[54] PRESSURE SENSITIVE RESISTOR CELL AND METHOD FOR DETECTING THRESHOLD VALUE OF STYLUS USED THEREWITH

[75] Inventors: Minekazu Miyazaki; Noriyuki Nakanishi, both of Tokyo, Japan

[73] Assignee: SMK Corporation, Tokyo, Japan

[21] Appl. No.: 595,913

[22] Filed: Feb. 6, 1996

[30] Foreign Application Priority Data

Feb. 28, 1995 [JP] Japan ................... 7-063527

[51] Int. Cl.$^6$ .................................. G09G 5/00
[52] U.S. Cl. ........................... 345/173; 345/174
[58] Field of Search .................. 345/173, 174; 178/18, 19

[56] References Cited

U.S. PATENT DOCUMENTS 5,453,941 9/1995 Yoshikawa .................... 345/174
5,518,078 5/1996 Tsujioka et al. ............... 178/18

FOREIGN PATENT DOCUMENTS 6-309086 11/1994 Japan.
6-309087 11/1994 Japan.

Primary Examiner—Mark R. Powell
Assistant Examiner—Matthew Luu
Attorney, Agent, or Firm—Rabin, Champagne & Lynt, P.C.

[57] ABSTRACT

A simple-structured pressure sensitive resistor cell which permits the setting of a stylus pressure detecting threshold value VT and a stylus pressure detecting threshold value setting method therefor. A midtap T of a series connection of two or more resistors R1, R2 is connected to an input terminal of an A/D converter and a potential voltage divided by the resistors at the midtap T is defined as the stylus pressure detecting threshold value VT. Therefore, the stylus pressure detecting threshold value VT can be adjusted simply by changing the resistance value of either one of the resistors.

6 Claims, 7 Drawing Sheets

5,712,662

PRESSURE SENSITIVE RESISTOR CELL AND METHOD FOR DETECTING THRESHOLD VALUE OF STYLUS USED THEREWITH

CROSS-REFERENCE TO RELATED APPLICATION

This application is based upon and claims priority from Japanese Patent Application No. 7-63527 filed Feb. 28, 1995, the entire disclosure of which is incorporated herein by reference.

BACKGROUND OF THE INVENTION

1. Field of the Invention

The present invention relates to a pressure sensitive resistor cell that detects the position where a stylus, finger or the like is pressed thereagainst. More particularly, the present invention is directed to a pressure sensitive resistor cell that detects the stylus pressure applied thereto by comparing a voltage variation caused by the stylus pressure with a stylus pressure detecting threshold value. Also, the invention relates to a method for detecting a threshold setting for the stylus pressure.

2. Description of the Related Art

As shown in FIG. 6, a conventional pressure sensitive resistor cell includes a pair of opposed X- and Y-coordinate resistor plates 101 and 102, respectively, which are slightly spaced apart by an insulating spacer or the like (not shown) interposed between the plates 101 and 102. The resistance layers of the plates face each other.

Each of the resistance layers is formed by a uniform or homogeneous resistance layer. Thus, when a coordinate detecting voltage, VCC, is applied to an electrode at one side of the resistor plate and an electrode at the opposite side of the resistor plate is grounded, a potential is developed throughout the resistor plate in proportion to the distance from either electrode, by that generating a potential gradient.

Coordinate detection in such a pressure sensitive resistor cell begins with closing X-side switches 103 and 104 under the control of a CPU 105 to generate a potential gradient in the X-coordinate resistor plate 101. In this situation, switch 107 is connected to an input terminal of A/D converter 106 to connect A/D converter 106 with the electrode side of the Y-coordinate resistor plate 102.

When the X-coordinate resistor plate 101 is pressed by a stylus or the like at a point P (x,y), the potential VP at the point P becomes VCC×x1÷(x1+x2), where x2 is that resistance proportional to the distance from the input side electrode and x1 being the resistance proportional to the distance from the ground side electrode. The potential VP is detected by the A/D converter 106 and the converter output is fed to the CPU 105, in which the X coordinate (x) is calculated by a calculating means contained in CPU 105.

Next, X-side switches 103 and 104 are turned OFF, i.e., opened, and Y-side switches 108 and 109 are turned ON, i.e., closed. Switch 107, which is connected to the input terminal of A/D converter 106, is then connected to electrode side 110 of the X-coordinate resistor plate 101.

Similarly, letting the resistance proportional to the distance from the input side electrode and the resistance proportional to the distance from the ground side electrode be represented by y2 and y1, respectively, the potential VP at the point P is given by VCC×y1÷(y1+y2). The potential VP is fed via the A/D converter 106 to the CPU 105 to calculate the Y coordinate (y).

Since in the coordinate detecting mode a potential is always applied to the X- and Y-coordinate resistor plates 101 and 102 alternately, a large power consumption is inevitable. To avoid this, the conventional pressure sensitive resistor cell, such as disclosed in Japanese Pat. Laid-Open No. 309086/94 and shown in FIG. 6, has a configuration such that while in its waiting state no potential is applied to either of the resistor plates, but the coordinate detection mode follows detection of the stylus pressure.

That is, while in its waiting state, the resistor cell is configured such that switch 104 of the X-coordinate resistor plate 102 is ON and the other switch 103 is OFF to maintain the X-coordinate resistor plate 101 at the potential VCC, whereas the Y-coordinate resistor plate 102 is grounded with the switch 108 OFF and the switch 109 ON.

In this instance, if switch 107 connected to the input terminal of A/D converter 106 is held at electrode side 110 of X-coordinate resistor plate 101, the potential at the input terminal takes the value VCC as discussed above.

If the X-coordinate resistor plate 101 is pressed by a stylus or the like at position P, a current flows from point P to the ground side via Y-coordinate resistor plate 102 and switch 109, and the potential at electrode 110 of X-coordinate resistor plate 101, that is, the potential at the input terminal of A/D converter 106 drops to a predetermined value.

The CPU 105 compares this potential with a preset stylus pressure detecting threshold value VT and, if the former is smaller than the latter, judges that the resistor plate is being pressed, and enters the coordinate detecting mode described above.

The potential VP having dropped by the stylus pressure is expressed by VCC×(y1+r)÷(x2+y1+r), where r is a contact resistance. As shown in FIG. 7a, this potential, which is VCC before the application of the stylus pressure, varies with a decrease in the contact resistance r and becomes stabilized at VPL when the contact resistance r reaches its minimum value.

In view of this, it is customary in the art to set the stylus pressure detecting threshold value VT a little higher than the potential VPL as shown in FIG. 7a, pre-store this value in a ROM (not shown) and compare it with the voltage VP for checking to see if the resistor plate is being pressed.

Since the potential VPL corresponding to the minimum value of the contact resistance r varies with the resistance values x2 and y1 of the X- and Y-coordinate resistor plates, however, the potential VPL differs with cells based upon the material used for the resistance layers of each resistor plate and the thickness of the resistance film.

Accordingly, when the stylus pressure detecting threshold value VT set as shown in FIG. 7a is used to set the stylus pressure detecting threshold value VT1 of a different cell, there are cases where VT goes below the potential VPL, as shown in FIG. 7(b), thereby making it impossible to detect the stylus pressure applied to the resistor plate.

For example, a cell having its resistance layers formed of carbon and a cell using ITO (Indium Tin Oxide) each require use of a ROM carrying different stylus pressure detecting threshold values VT. Therefore, the carbon-based cell and the ITO-based cell cannot share the same ROM.

One possible solution to this problem is to increase the stylus pressure detecting value VT up to a potential a little lower than the potential VCC in the waiting state and use it as a stylus pressure detecting threshold value VT2. However, when the potential VP exceeds the stylus pressure detecting threshold value VT2, the contact resistance r has not yet dropped to a value so as to be negligibly small as compared with the internal resistance of A/D converter 106 or the like. Therefore, if in this case CPU 105 goes into the coordinate detecting mode after judging that the resistor plate is being pressed, coordinate detection is affected by variations in the contact resistance r.

That is, in the case of detecting the position of the coordinate (x,y), e.g., the X coordinate (x) in the coordinate detecting mode, the potential VP at the point P is detected by reading the potential via the A/D converter 106 as depicted in FIG. 6, but this detection is based upon the precondition that the contact resistance r is stable at point P and is negligibly small as compared with the internal resistance RA (1 to 10 MΩ) of A/D converter 106. The contact resistance r acquires a large value immediately after the potential VP at point P exceeds the stylus pressure detecting threshold value VT2.

The potential VP' that is read via A/D converter 106 is VP×RA÷(RA+r), so that when the contact resistance r becomes non-negligibly large compared with the internal resistance RA of A/D converter 106, the variation in the contact resistance r appears in the potential VP', which is read by A/D converter 106. Thus, an error is introduced in coordinate detection.

Especially when the contact resistance r is large, the influence of external noise is serious, constituting yet another obstacle to accurate coordinate detection.

There has also been proposed a pressure sensitive resistor cell of the type that a period T0, FIG. 7a, in which the contact resistance r is allowed to drop to a sufficiently small value after the detection of the stylus pressure on the basis of the stylus pressure detecting threshold value VT2, is set in order to defer the start of the subsequent coordinate detecting mode. This cell, however, needs an extra timer circuit, and therefore is more costly and complex in circuit construction.

Moreover, the time until the contact resistance r becomes sufficiently low varies according to the condition of the stylus being pressed and it is difficult to set the period TO so as to be accurate for all different types of stylus used.

In FIG. 7a, the stylus pressure detecting threshold value VT needs to be set at a value above the potential VPL, which is dependent on the material used for the resistors and their film thicknesses, and below the potential VPC at which the variations in the contact resistance r have no influence on coordinate detection. Since the potentials VPL and VPC are inherent to individual cells, it is necessary to set the stylus pressure detecting threshold value VT for each cell and store it in a ROM.

Conversely, the threshold value VT, once stored in the ROM, cannot be used with different model cells, so that the ROM must be changed to an appropriate one each time a different cell is constructed.

SUMMARY OF THE INVENTION

It is therefore an object of the present invention to provide a simple-structured pressure sensitive resistor cell that permits the quick and reliable setting of the stylus pressure detecting threshold value VT and a stylus pressure detecting threshold value setting method for such a pressure sensitive resistor cell.

According to a first aspect of the present invention, a pressure sensitive resistor cell includes a pair of opposed X- and Y-coordinate resistor plates with a slight insulating gap defined therebetween, an A/D converter having its input terminal connectable to an electrode of either one of the resistor plates, and a CPU which while in the waiting state, effects control to apply a detecting voltage to one of the resistor plates and ground the other. When the potential at the input terminal of the A/D converter exceeds a stylus pressure detecting threshold value due to a voltage variation by the stylus pressure applied to the one resistor plate, the CPU judges that the one resistor plate is being pressed. The input terminal of the A/D converter is connected to the midtap of a series connection of two or more resistors to set the stylus pressure detecting threshold value as the voltage dividing ratio between the two or more resistors.

According to a second aspect of the present invention, a pressure sensitive resistor cell includes a pair of opposed X- and Y-coordinate resistor plates with a slight insulating gap defined therebetween, an A/D converter having its input terminal connectable to an electrode of either one of the resistor plates, and a CPU, which while in the waiting state, effects control to apply a detecting voltage to one of the resistors and ground the other. When the potential at the input terminal of the A/D converter exceeds a stylus pressure detecting threshold value due to a voltage variation by the stylus pressure applied to the one resistor, the CPU judges that the one resistor plate is being pressed. The stylus pressure detecting threshold value is set to the potential at the input terminal of the A/D converter, with the potential being provided after a contact resistance between the resistor plates has dropped to such an extent that its variation is negligibly small.

According to a third aspect of the present invention, in a pressure sensitive resistor cell satisfying the second aspect, the input terminal of the A/D converter is connected to the midtap of a series connection of two or more resistors and the stylus pressure detecting threshold value is set as the voltage dividing ratio between the two or more resistors.

According to a fourth aspect of the present invention, in a pressure sensitive resistor cell of the first or third aspect, at least one of the two or more resistors is a variable resistor and its resistance value is adjusted to set the stylus pressure detecting threshold value.

The present invention also includes as a method for setting a stylus pressure detecting threshold value using a stylus satisfying any of the first through fourth aspects.

According to a fifth aspect satisfying the present invention, in a stylus pressure detecting threshold value setting method for the pressure sensitive resistor cell, at least one of the two or more resistors is a variable resistor and its resistance value is adjusted to set the stylus pressure detecting threshold value. The method includes the steps of applying a detecting voltage to one of the resistor plates while the CPU is in a waiting state, grounding the other resistor plate, and connecting an input terminal of an A/D converter to an electrode of either of the resistor plates. When the potential at the input terminal of the A/D converter exceeds a threshold value due to a voltage variation by the stylus pressure applied to the one resistor plate, the CPU judges that the one resistor plate is being pressed. The cell is constructed so that the input terminal of the A/D converter is connected to a midtap of a series connection of at least two resistors and so that the stylus pressure detecting threshold value is set by the voltage dividing ratio between the at least two resistors and is input to the CPU via the input terminal of the A/D converter.

A brief description will be given of the effectiveness of the present invention.

In the pressure sensitive resistor cell satisfying the first aspect of the invention, the midtap of a series connection of two or more resistors is connected to the input terminal of the A/D converter and the voltage-divided divided potential at the midtap is fed to the input terminal of the A/D converter. The A/D converter converts the potential at the midtap to obtain the stylus pressure detecting threshold value VT in digital form.

Since the potential at the midtap is provided as analog data to the input terminal of the A/D converter and then input into the CPU, the CPU needs only to have one input terminal to set the stylus pressure detecting threshold value VT.

By changing the resistance value of any one of the series-connected resistors, the potential at the midtap is also varied. Therefore, the stylus pressure detecting threshold value VT can be modified as desired.

In the pressure sensitive resistor cell satisfying the second aspect of the invention, since the stylus pressure detecting threshold value VT is set to the potential at the input terminal of the A/D converter that is provided after the contact resistance between the resistor plates has dropped to such an extent that its variation is negligibly small, the coordinate detection is free from the influence of the variation in the contact resistance.

In the pressure sensitive resistor cell satisfying the third aspect of the present invention, since the input terminal of the A/D converter is connected to the midtap of a series connection of two or more resistors and the stylus pressure detecting threshold value is set as the voltage dividing ratio between the resistors, it is possible to change the potential at the midtap while changing the resistance value of any one of the resistors. This allows ease in setting the stylus pressure detecting threshold value VT at a potential immediately prior to the stabilization of the voltage that is varied by the stylus pressure.

In the pressure sensitive resistor cell satisfying the fourth aspect of the invention, since at least one of the two or more resistors is a variable resistor and its resistance value is adjusted from the outside, an optimum stylus pressure detecting threshold value can easily be set.

In the stylus pressure detecting threshold value setting method according to the fifth aspect of the invention, the midtap of a series connection of two or more resistors is connected to the input terminal of the A/D converter and the voltage-divided potential at the midtap is fed to the input terminal of the A/D converter. The A/D converter converts the potential at the midtap to obtain the stylus pressure detecting threshold value VT in digital form.

By changing the resistance value of any one of the series-connected resistors, the potential at the midtap also varies correspondingly. Therefore the stylus pressure detecting threshold value VT can be modified as wanted.

In the stylus pressure detecting threshold setting method according to the present invention, since at least one of the two or more resistors is a variable resistor, the stylus pressure detecting threshold value can be modified by adjusting the resistance value of the variable resistor.

BRIEF DESCRIPTION OF THE DRAWINGS

Other objects, characteristics, and advantages of the present invention, as well as economies of manufacture, will become apparent to one skilled in the art from reading the following detailed description in combination with the appended claims and drawings, all of which form a part of this specification. In the drawings:

DETAILED DESCRIPTION OF THE PREFERRED EMBODIMENTS

Figure 1:
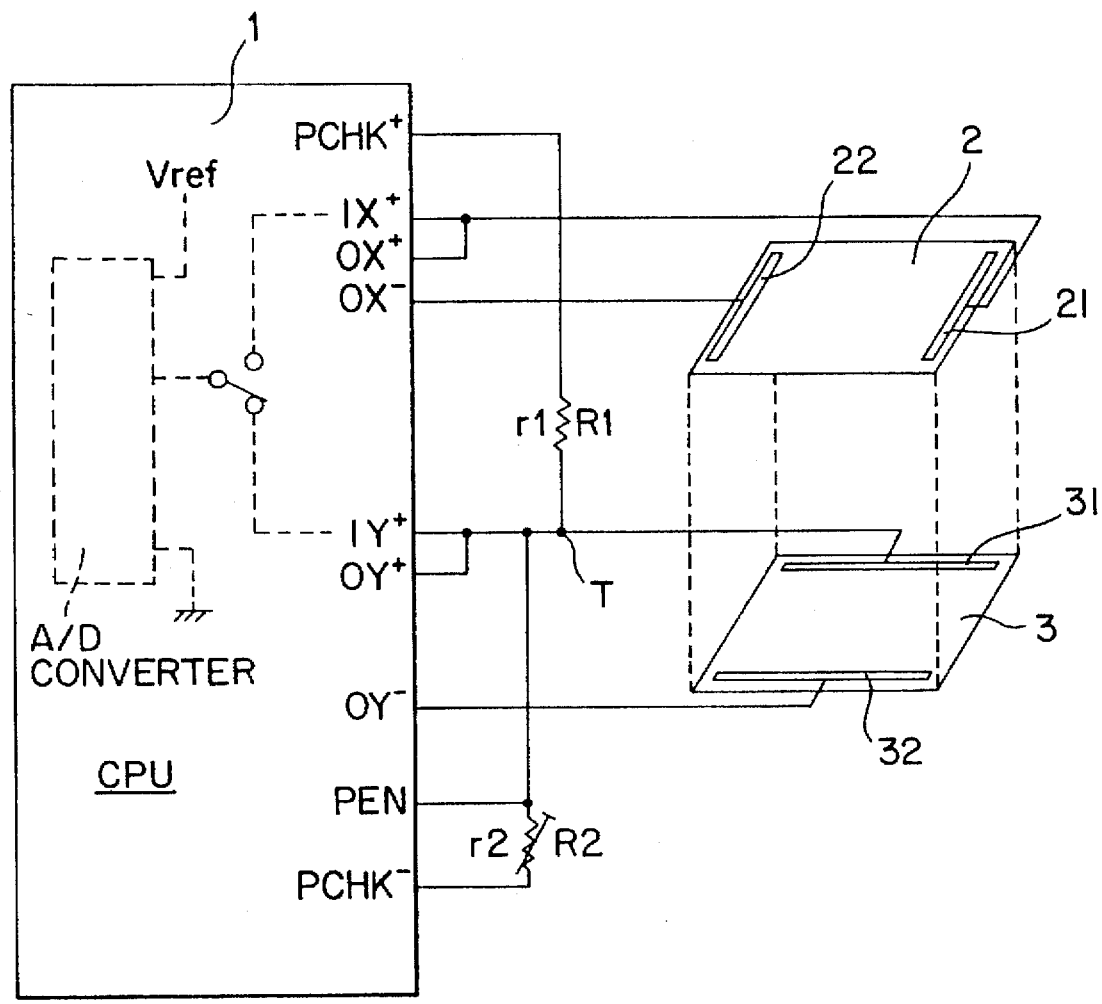
FIG. 1 is a circuit diagram of the pressure sensitive resistor cell according to the present invention.

FIG. 1 schematically illustrates an embodiment of the pressure sensitive resistor cell of the present invention, in which a CPU 1 has a built-in A/D converter, together with its input terminals IY+ and IX+.

The terminal IX+ is connected to a voltage input side electrode 21 of X-coordinate resistor plate 2, as is terminal OX+. Ground side electrode 22 of X-coordinate resistor plate 2 is grounded via terminal OX– of CPU 1.

Similarly, the terminal IY+ is connected to voltage input side electrode 31 of Y-coordinate resistor plate 3, together with a terminal OY+. Ground side electrode 32 of Y-coordinate resistor plate 3 is grounded via terminal OY– of CPU 1.

Terminal IY+ is also connected to the midtap T between pullup resistor R1 having a 100 KΩ resistance value and adjusting resistor R2, which is a variable resistor whose resistance value is variable from 1.5 to 3 KΩ. Pullup resistor R1 is connected at the end opposite midtap T to terminal PCHK+ of the CPU 1 for the application of a detecting voltage VCC, and adjusting resistor R2 is connected at the end opposite midtap T to terminal PCHK– of CPU 1 for grounding purposes.

Pullup resistor R1 and adjusting resistor R2 constitute a stylus pressure detecting value setting circuit and the voltage dividing ratio between resistors R1 and R2 sets or defines the stylus pressure detecting threshold value.

While this embodiment employs a variable resistor as adjusting resistor R2 to modify the potential at midtap T, it is also possible to change the potential at midtap T by selecting the resistance value of pullup resistor R1.

Moreover, in this embodiment, since a primary detection of a voltage variation by the stylus pressure at a CMOS level is performed prior to its comparison with the stylus pressure detecting threshold value, midtap T is connected to a terminal PEN of the CPU 1 as well.

The input/output at these terminals of CPU 1 and the switching of the input terminals of the A/D converter are placed under the control of CPU 1.

In the pressure sensitive resistor cell having a structure as described above, the setting of the stylus pressure detecting threshold value begins with setting terminal PCHK+ at the potential VCC to apply a detecting voltage to one end of pullup resistor R1 and setting terminal PCHK– to ground level to ground the end of adjusting resistor R2 opposite midtap T.

The potential at midtap T is dependent on the voltage dividing ratio between pullup resistor R1 and adjusting resistor R2. Letting the resistance values of resistors R1 and R2 be represented by r1 and r2, respectively, the potential at midtap T is given by $VCC \times r2 \div (r1+r2)$.

The potential at midtap T is fed via input terminal IY+ into CPU 1, where it is converted by the A/D converter to digital data of 10 bits, which is the same number of bits as is found in the A/D converter. In CPU 1, the thus converted digital data is stored as the stylus pressure detecting threshold value VT in a RAM (not shown).

Since CPU 1 compares the A/D converted voltage at the terminal IY+ with the stylus pressure detecting threshold value VT as will be described later, it is necessary that the stylus pressure detecting threshold value VT stored in the RAM be stored as digital data composed of bits with the number of bits equaling that of the A/D converter.

Therefore, in the case where stylus pressure detecting threshold value VT is entered from an exterior source such as a keyboard or the like, digital data with the same number of bits as the A/D converter needs to be input into CPU 1, which is required to be provided with input terminals equal in number to the number of bits of digital data.

In contrast thereto, in this embodiment, since the stylus pressure detecting threshold value VT is fed in analog form via the input terminal of the A/D converter, CPU 1 needs only to have one input terminal for inputting thereto the stylus pressure detecting threshold value VT. Such a sequence of steps for the initialization of the stylus pressure detecting threshold value is performed each time CPU 1 is turned ON or receives a reset signal from the outside.

When the thus set stylus pressure detecting threshold value VT is inappropriate for the reason such as "no stylus pressure is detected" or "the coordinate detection is affected by variations in the contact resistance," the threshold value VT can be reset by changing the resistance value of variable adjusting resistor R2 and turning ON or resetting CPU 1.

The voltage at midtap T varies with the variation in the resistance value of adjusting resistor R2. By the same processing as mentioned above, a new threshold value VT is stored in the aforementioned RAM.

In this way, by selectively changing the resistance value of adjusting resistor R2, the stylus pressure detecting threshold value VT can be set at a potential above the minimum potential VPL by the stylus pressure, which is dependent on the material and thickness of the resistance layer, but below the potential VPC which is provided when the contact resistance between the resistor plates drops to such an extent so that its variation is negligibly small.

Thus, when the stylus pressure is detected from the stylus pressure detecting threshold value VT, the contact resistance is already negligibly small as compared with the internal resistance of the A/D converter. Thus, the subsequent coordinate detection is not affected by variations in the contact resistance.

After setting of the stylus pressure detecting threshold value VT, CPU 1 enters the sleep mode and remains in the waiting state until the stylus pressure is detected next.

Turning now to FIGS. 2(a) to 2(i), the operation of the pressure sensitive resistor cell of the FIG. 1 embodiment will be described.

At time t0 when the initialization of the stylus pressure detecting threshold value is completed, CPU 1 goes into the waiting state.

Figure 2:
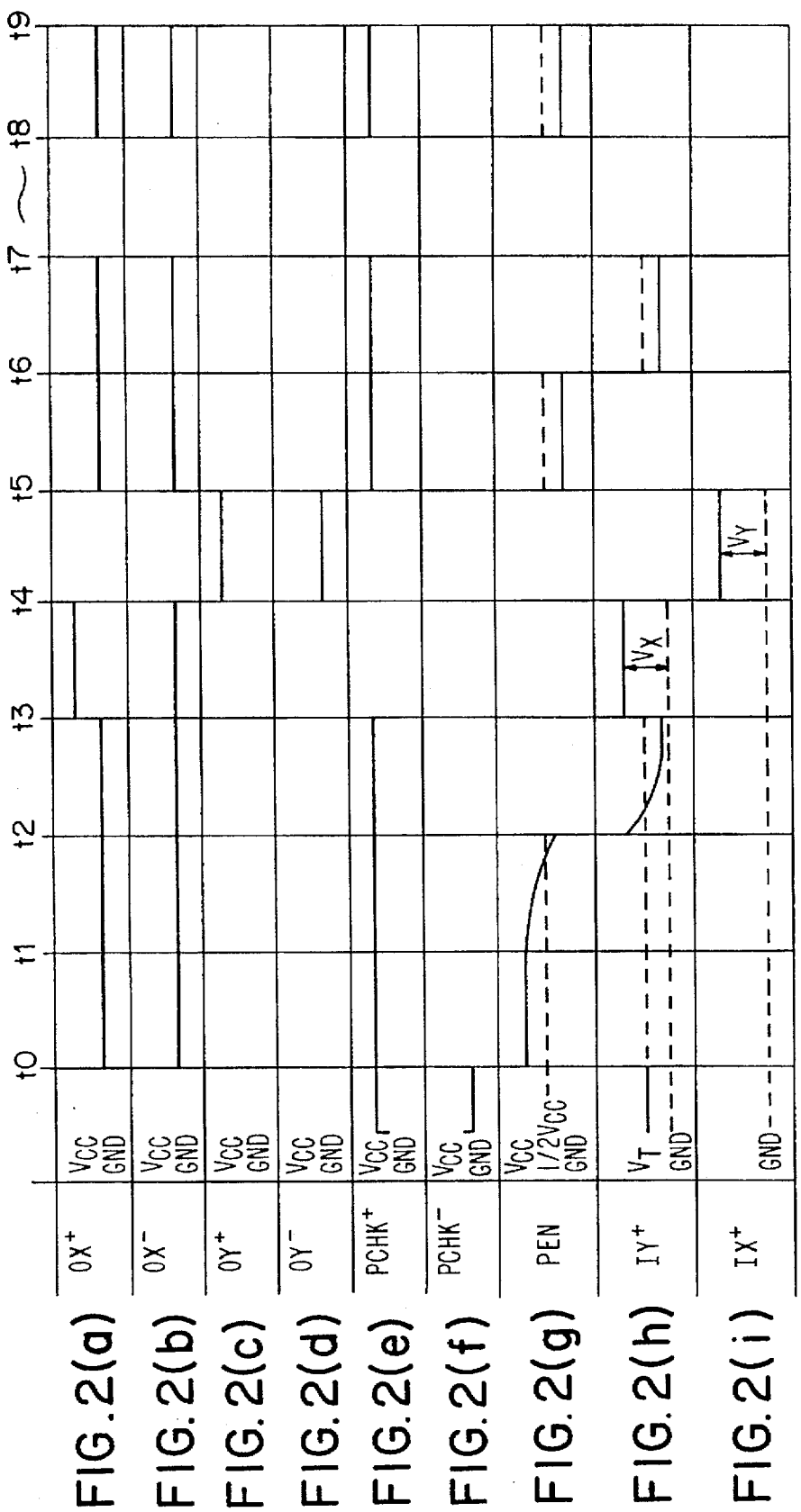
FIGS. 2(a)–2(i) are waveform diagrams explaining the operation of the pressure sensitive resistor cell shown in FIG. 1.

While in this waiting state, CPU 1 holds terminal PCHK+ (FIG. 2(e)) at potential VCC, terminal PCHK− (FIG. 2(f)) in the OFF state (high impedance) and Y-coordinate resistor plate 3, midtap T and terminal PEN (FIG. 2(g)) at potential VCC.

On the other hand, X-coordinate resistor plate 2 is held at ground level with terminals OX+ (FIG. 2(a)) and OX− (FIG. 2(b)) connected to both electrodes of resistor plate 2, which are grounded.

Consequently, no current flows in the resistor plates and any other circuits of the pressure sensitive resistor cell. Since CPU 1 is in the sleep mode in which all its circuits, including the A/D converter, are in the OFF state, the power dissipation of the entire cell structure is very small.

The CPU 1 is provided with primary stylus pressure detecting means that compares the potential at terminal PEN with the stylus pressure detecting threshold value VT at the CMOS level, and when the potential at terminal PEN goes down below ½ VCC, the primary stylus pressure detecting means makes the primary detection that a stylus is being urged against the resistor plate.

Figure 3:
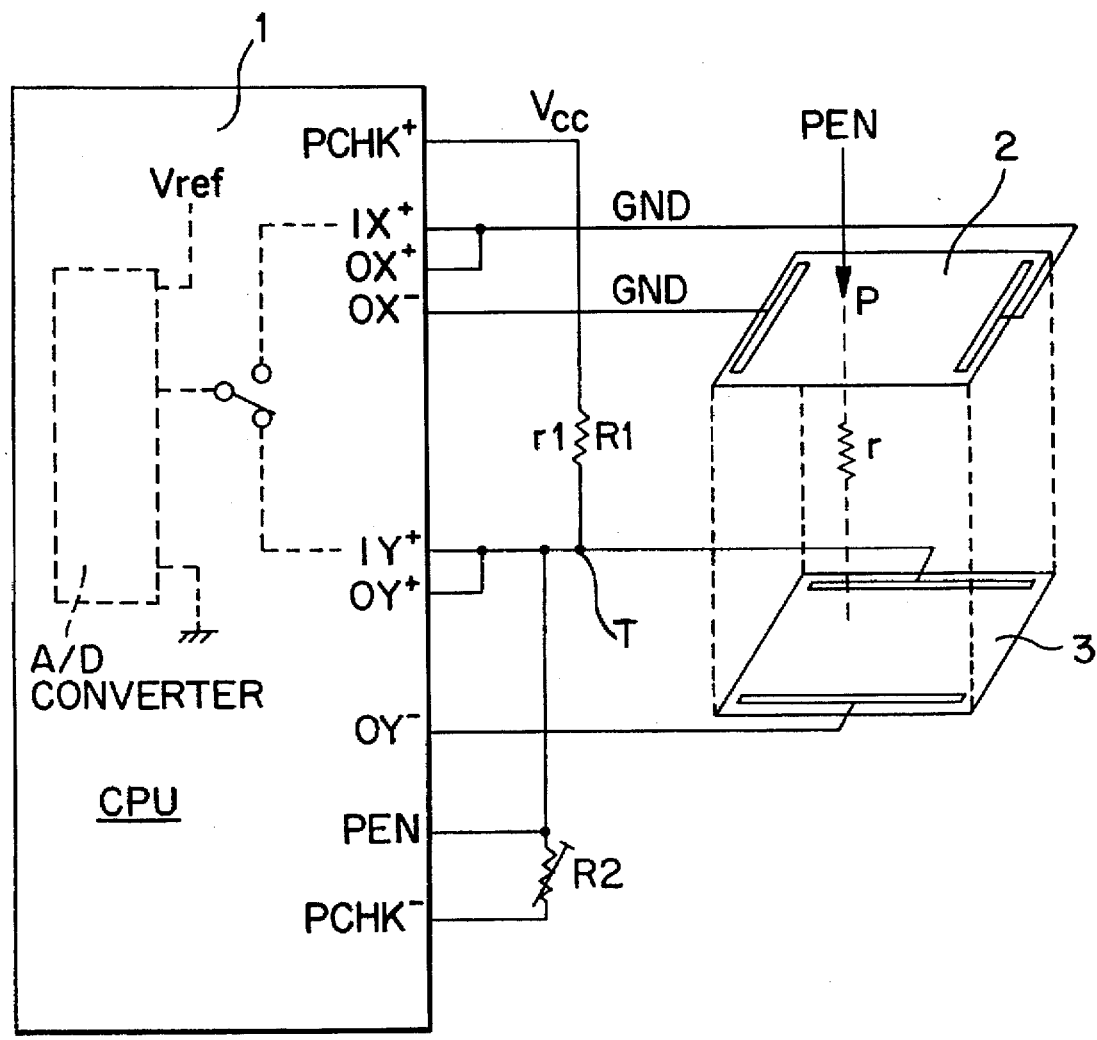
FIG. 3 is a circuit diagram showing the stylus pressure detecting state in the pressure sensitive resistor cell of FIG. 1.

If the resistor plate is pressed by the stylus at point P as shown in FIG. 3, a current flows from terminal PCHK+ to terminals OX+ and OX− via midtap T, Y-coordinate resistor plate 3, point P, and X-coordinate resistor plate 2.

In this instance, the potential at terminal PEN is equal to the potential at midtap T. At time t1, as the resistor plate is being pressed at point P, the potential at terminal PEN begins to drop with a decrease in the contact resistance at point P as shown in FIG. 2(g).

Since the resistance value r1 of pullup resistor R1 is set larger than the resistance value of the X-coordinate resistor plate 2, the potential at the terminal PEN goes down below ½ VCC when the contact resistance r decreases to some extent. Then, the primary detection of the stylus pressure is made by the primary stylus pressure detecting means. At time t2 in FIG. 2(g), CPU 1 leaves the sleep mode and goes into a secondary stylus pressure detecting mode.

In the secondary stylus pressure detecting mode, all the circuits in CPU 1, including the A/D converter, are driven. The potential at midtap T is fed via the input terminal IY+ into CPU 1, where it is converted by the A/D converter to digital form and compared with the stylus pressure detecting threshold value VT read out of the RAM.

When the potential at midtap T goes down below the stylus pressure detecting threshold value VT, it is determined in the secondary stylus pressure detecting mode that the resistor plate is being pressed by the stylus at point P.

Upon the detection of the stylus pressure in the secondary stylus pressure detecting mode, CPU 1 enters at time t3 a coordinate detecting mode in which to detect the X and Y coordinates of point P.

Figure 4:
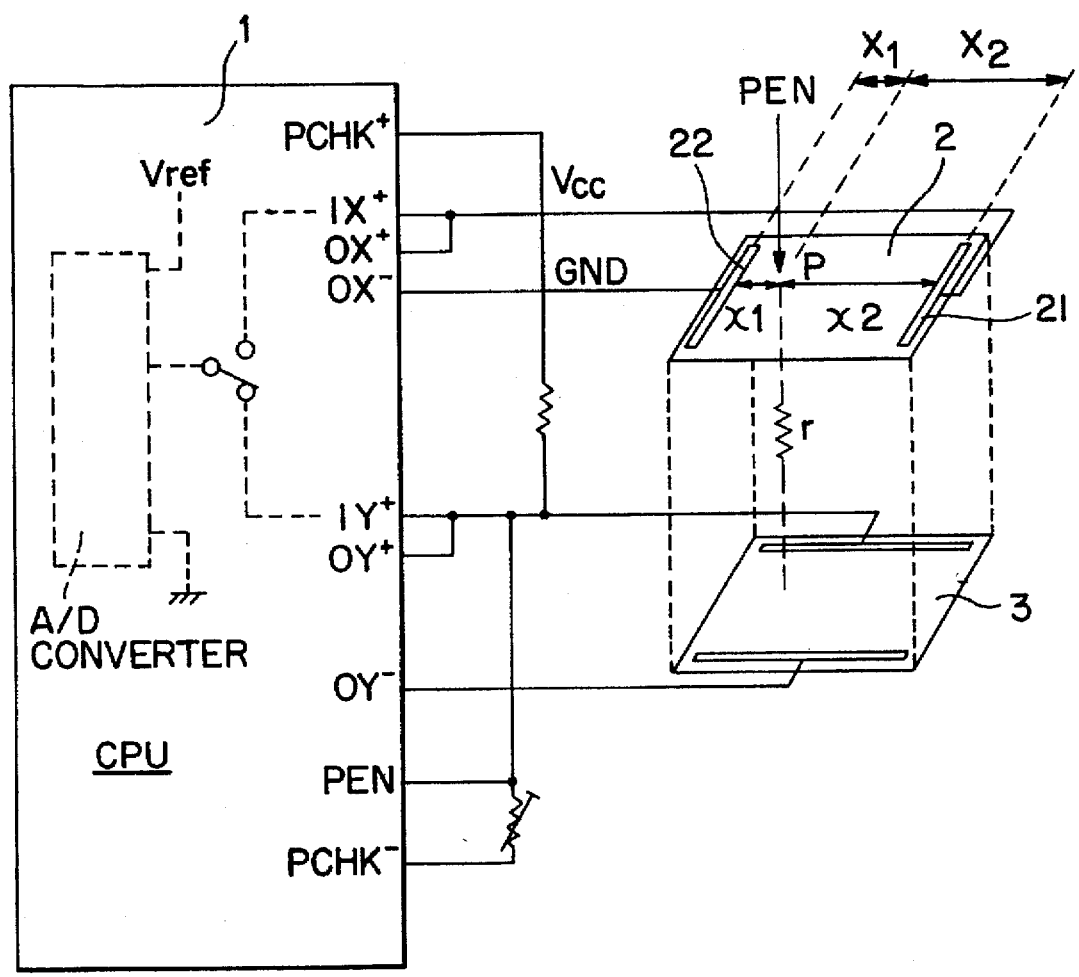
FIG. 4 is a circuit diagram showing the cell in an X coordinate detecting mode.

The coordinate detecting mode starts with generating a potential gradient in X-coordinate resistor plate 2 to detect the X coordinate of point P. As depicted in FIG. 4, the voltage VCC is applied to terminal OX+ connected to voltage input side electrode 21 of X-coordinate resistor plate 2 and terminal OX− connected to ground side electrode 22 is grounded. Thus, a potential gradient from the voltage VCC to the ground potential is provided in X-coordinate resistor plate 2.

Letting the voltage dividing resistances at pressed point P be represented by x1 and x2 as shown in FIG. 4, the voltage VP at pressed point P is given by $VCC \times x1 \div (x1+x2)$. At this time, since the contact resistance r is already negligibly small as compared with the internal resistance RA of the A/D converter, the potential VX at input terminal IY+ of the A/D converter is substantially equal to the voltage VP at pressed point P and is free from the influence of the variation in the contact resistance r.

Since the voltage dividing resistances x1 and x2 are proportional to the distances X1 and X2 between the point P and the respective electrodes 21 and 22, the X coordinate of the point P can be calculated from the voltage VP. Hence, CPU 1 calculates the X coordinate of the point P after A/D conversion of the potential VX, which is nearly equal to the voltage VP.

Figure 5:
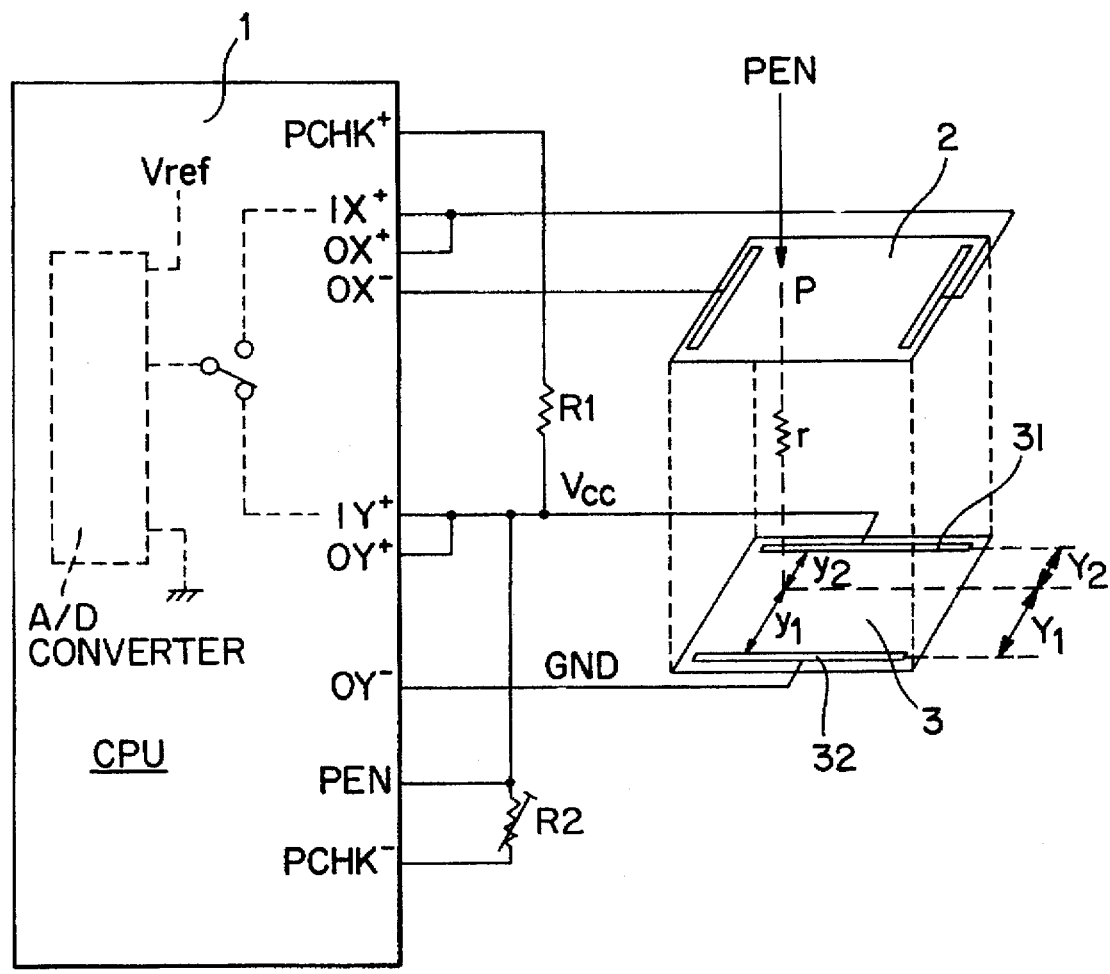
FIG. 5 is a circuit diagram showing the cell in a Y coordinate detecting mode.
Figure 6:
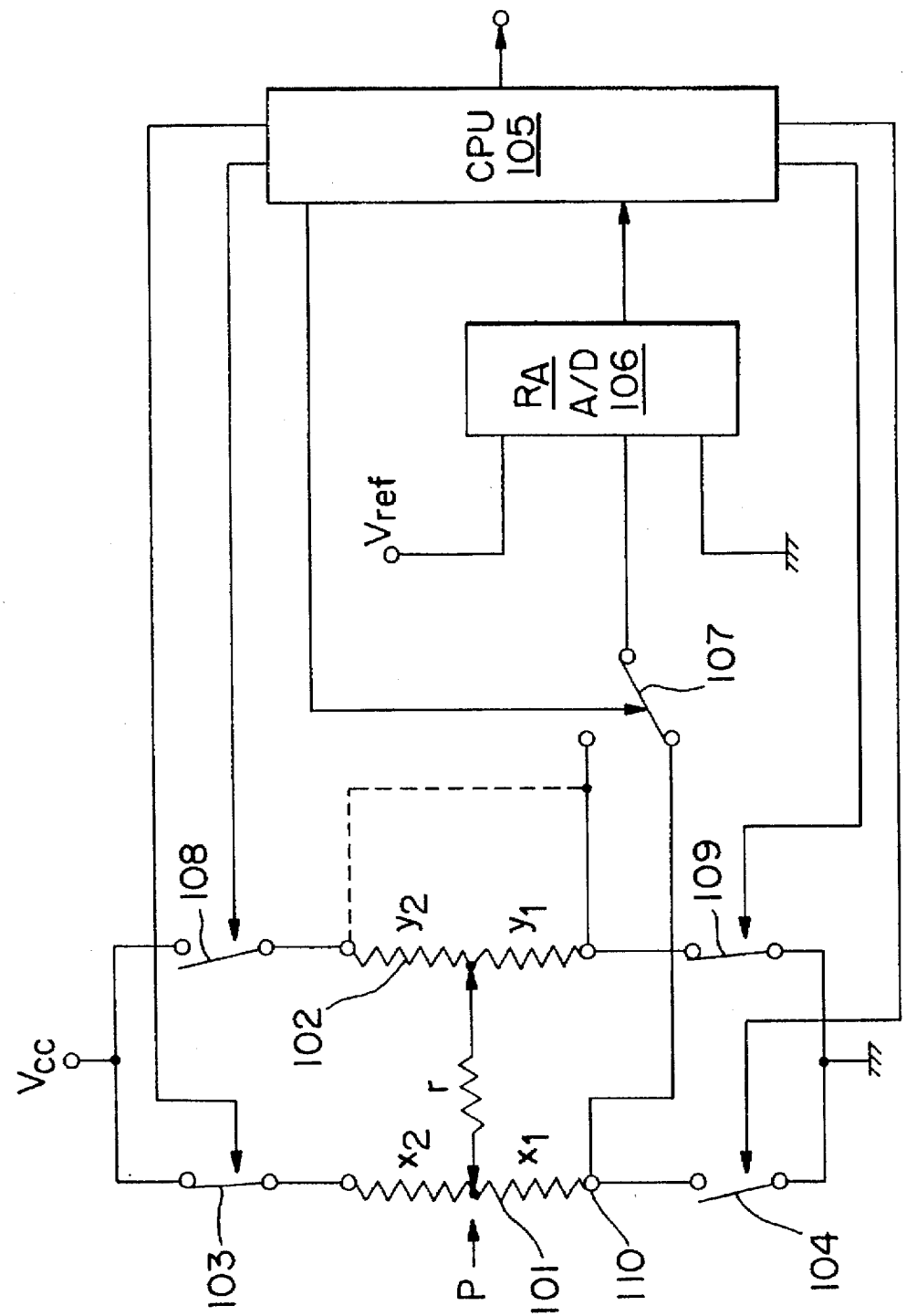
FIG. 6 is a circuit diagram of a conventional pressure sensitive resistor cell.
Figure 7B:
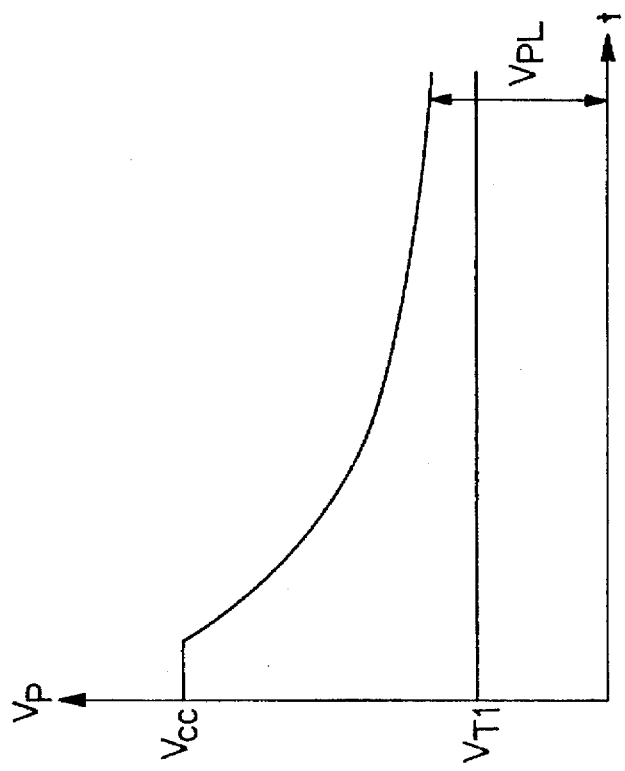
FIGS. 7a and 7b are graphs showing the relationship between the voltage VP at the pressed point P which is varied by the stylus pressure applied thereto and the stylus pressure detecting threshold value VT.
Figure 7A:
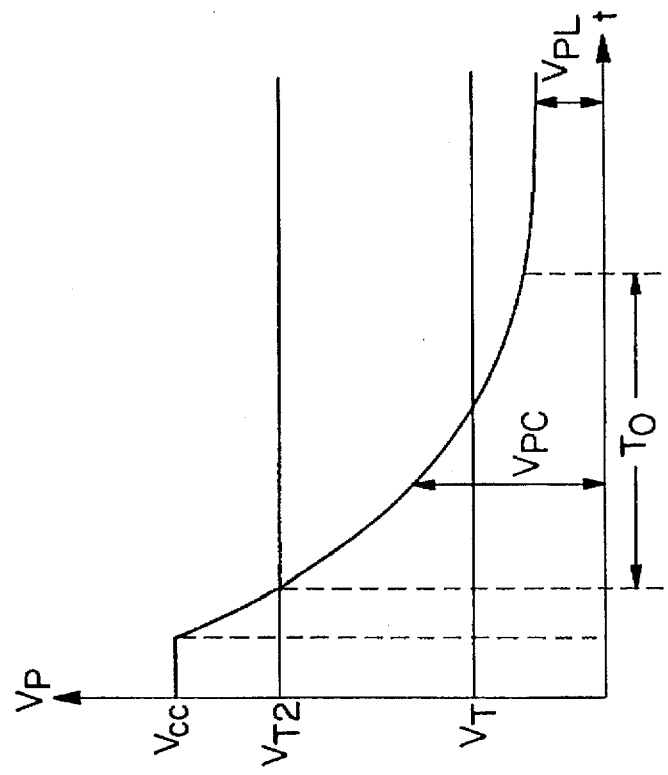

Then, at time t4, terminals OX+ and OX– are turned OFF and the A/D converter is connected to terminal IX+ (FIG. 2(i)) and the Y coordinate of the point P is detected. As shown in FIG. 5, the voltage VCC is applied to the terminal OY+ (FIG. 2(c)) connected to voltage input side electrode 31 of Y-coordinate resistor plate 3 and terminal OY– (FIG. 2(d)) connected to ground side electrode 32 of resistor plate 3 is grounded, by which a potential gradient from the voltage VCC to the ground potential is provided in Y-coordinate resistor plate 3.

Letting the voltage dividing resistances at the pressed point P be represented by y1 and y2, the voltage VP at the pressed point P is given by VCC×y1÷(y1+y2). Since the voltage dividing resistances y1 and y2 are proportional to the distances Y1 and Y2 between point P and the respective electrodes 31 and 32, the Y-coordinate of the point P can be derived from the voltage VP.

As with the X coordinate detection, the contact resistance r is already negligibly small as compared with the internal resistance of the A/D converter. Besides, the sum of the contact resistance r and the internal resistance RA of the A/D converter is far larger than the resistance value of X-coordinate resistor plate 2. Thus, the voltage VP and the potential VY at the terminal IX+ are nearly equal to each other and are free from the influence of variations in the contact resistance r. therefore, CPU 1 calculates the Y coordinate of point P from the potential VY after the A/D converter converts it to digital form.

As depicted in FIGS. 2(a) and 2(b), upon completion of the detection of the X and Y coordinates at time t5, CPU 1 turns OFF terminals OY+ and OY– and repeats the stylus pressure detecting procedure from time t1 to t3.

In the stylus pressure detecting procedure from time t5 to t7, when the potential at terminal PEN (FIG. 2(g)) is below ½ VCC and the potential at terminal IY+ (FIG. 2(h)) is also below the stylus pressure VT, CPU 1 determines that the stylus has been pressed against the cell once coordinate detection is finished. The X and Y coordinates just detected are provided as effective positional information to a personal computer or similar host processor (not shown).

When no stylus pressure can be detected by either the primary or secondary stylus pressure detecting procedures, CPU 1 determines that the stylus was taken off the cell during the coordinate detection, and positional information of the X and Y coordinates just detected is rendered invalid.

Once the stylus pressure is detected and the coordinate detection is performed accordingly, the stylus pressure detection is resumed at time t8 after a predetermined period of time, e.g. 5 msec.

If stylus pressure is detected, the above-described coordinate detecting procedure from time t1 to t7 is repeated.

In the event that no stylus pressure is detected even after the stylus pressure detection is repeated a predetermined number of times, CPU 1 determines that cell manipulation has been discontinued, and the CPU 1 goes into the waiting state at time t0 and remains in the sleep mode until time t1.

In this embodiment, the resistance value of the series connection of resistors is changed by altering the value of variable adjusting resistor R2, but the resistance value may also be changed by replacing either pullup resistor R1 or adjusting resistor R2 with a resistor of a different resistance value.

While this embodiment has been described to judge that the resistor plate is being pressed when the potential by the stylus pressure goes down below the stylus pressure detecting threshold value VT, it is also possible to employ a configuration in which a detecting resistor is interposed between the other resistor plate and the ground when the stylus pressure is detected. Then, the potential of the detecting resistor at the side near the resistor plate is compared with the stylus pressure detecting threshold value VT and it is judged that the resistor plate is being pressed when the potential by the stylus pressure exceeds the stylus pressure detecting threshold value VT.

Although CPU 1 has been described above as having a built-in A/D converter, the A/D converter and CPU 1 may be provided separately as long as the stylus pressure detecting threshold value can be input via the input terminal of the A/D converter.

As will be appreciated from the above, the present invention has advantages such as described below. According to the first or fifth aspect of the invention, since the midtap of the series connection of two or more resistors is connected to the input terminal of the A/D converter and the potential voltage-divided by the resistors at the midtap is used as the stylus pressure detecting threshold value VT, the stylus pressure detecting threshold value VT for a different pressure sensitive resistor cell can be set simply by changing the resistance value of any one of the series-connected resistors.

Accordingly, even when the potential VP which is varied by the stylus pressure does not exceed the stylus pressure detecting threshold value VT, which differs according to the resistor material and resistor film thickness, it is possible to detect the stylus pressure by modifying the stylus pressure detecting threshold value VT without the need of replacing the ROM with one better suited to that particular cell.

Also in the case where after the stylus pressure was detected on the basis of the stylus pressure detecting threshold value VT, the contact resistance r has not yet decreased to such an extent so as to be negligibly small, thus allowing the stylus pressure threshold value VT to be newly set, without necessitating changing the ROM with another. Thus, coordinate detection is not affected by variations in the contact resistance r.

Furthermore, since the stylus pressure detecting threshold value VT is input as analog data into CPU 1 via the input terminal of the A/D converter, CPU 1 requires only one input terminal for setting the stylus pressure detecting threshold value VT.

According to the second aspect of the invention, when the voltage variation by the stylus pressure exceeds the stylus pressure detecting threshold value VT, the contact resistance r between the resistor plates influenced by the stylus pressure drops to such an extent that its variation is negligibly small. Then, CPU 1 enters the coordinate detecting mode.

Therefore, there is no need of providing a timer circuit that allows the contact resistance r to decrease to a sufficiently small value after the resistor plate is judged to be pressed on the basis of the stylus pressure detecting threshold value VT. Therefore, it is possible, with a low-cost, simple structure, to prevent the coordinate detection process from being affected by variations in the contact resistance.

According to the third aspect of the invention, since the input terminal of the A/D converter is connected to the midtap of the series connection of at least two resistors and the stylus pressure detecting threshold value is set by the voltage dividing ratio between these resistors, it is possible to change the potential at the midtap by changing the resistance value of any one of the resistors. Hence, the stylus pressure detecting threshold value VT can easily be set at a potential which is given immediately before the voltage varying caused by the stylus pressure becomes stabilized.

According to the fourth and fifth aspect of the invention, since at least one of the two or more resistors is a variable resistor and its resistance value is adjusted from the outside, an optimum stylus pressure detecting threshold value can be set with ease.

It will be apparent that many modifications and variations may be effected without departing from the scope of the novel concepts of the present invention. Such modifications and variations are intended to be within the scope of the appended claims.

What is claimed is:

1. A pressure sensitive resistor cell, comprising:

a pair of opposed X- and Y-coordinate resistor plates with an insulating gap and a contact resistance defined therebetween, each of said resistor plates having two electrodes;

an A/D converter having an input terminal connected to an electrode of one of said resistor plates; and a CPU that has a waiting state mode, which effects control so as to apply a detecting voltage to one of said X- and Y-coordinate resistor plates and so as to ground the other, and which has a determination mode in which the CPU determines that said one resistor plate is being pressed by a stylus when the potential at said input terminal of said A/D converter exceeds a stylus pressure detecting threshold value due to a voltage variation caused by stylus pressure applied to said one resistor plate;

wherein said stylus pressure detecting threshold value is set at a potential obtained at said input terminal of said A/D converter in response to an application of stylus pressure to said one resistor plate after said contact resistance between said resistor plates drops to such an extent that its variation is negligibly small.

2. The pressure sensitive resistor cell of claim 1, further comprising at least two resistors connected in series, wherein said input terminal of said A/D converter is connected to a midtap of said at least two resistors and said stylus pressure detecting threshold value is set by the voltage dividing ratio between said at least two resistors.

3. The pressure sensitive resistor cell of claim 2, wherein at least one of said at least two resistors is a variable resistor having a variable resistance value and said stylus pressure detecting threshold value is set by adjusting the resistance value of said variable resistor from a source outside said cell.

4. A pressure sensitive resistor cell comprising:

a pair of opposed X- and Y-coordinate resistor plates with an insulating gap and a contact resistance defined therebetween, each of said resistor plates having two electrodes;

an A/D converter having an input terminal connected to an electrode of one of said resistor plates; and a CPU that has a waiting state mode, which effects control so as to apply a detecting voltage to one of said X- and Y-coordinate resistor plates, so as to ground the other, and so as to set at least said A/D converter in an OFF state, and has a primary determination mode in which the CPU switches from the waiting state mode to a secondary determination mode when a potential at one of the two electrodes of one of said X- and Y-coordinate resistor plates exceeds a first stylus pressure detecting threshold value at a CMOS level, wherein in the secondary determination mode the CPU determines that said one resistor plate is being pressed by a stylus when the potential at said input terminal of said A/D converter exceeds a second stylus pressure detecting threshold value due to a voltage variation caused by stylus pressure applied to said one resistor plate;

wherein said second stylus pressure detecting threshold value is set at a potential obtained at said input terminal of said A/D converter in response to an application of stylus pressure to said one resistor plate after said contact resistance between said resistor plates drops to such an extent that its variation is negligibly small.

5. The pressure sensitive resistor cell of claim 4, further comprising at least two resistors connected in series, wherein said input terminal of said A/D converter is connected to a midtap of said at least two resistors and said stylus pressure detecting threshold value is set by the voltage dividing ratio between said at least two resistors.

6. The pressure sensitive resistor cell of claim 5, wherein at least one of said at least two resistors is a variable resistor having a variable resistance value and said stylus pressure detecting threshold value is set by adjusting the resistance value of said variable resistor from a source outside said cell.

* * * * *